April 18, 1933. J. M. TITCOMB 1,904,905
BATCH DIVIDING AND COVERING MEANS
Filed Sept. 26, 1930 3 Sheets-Sheet 2
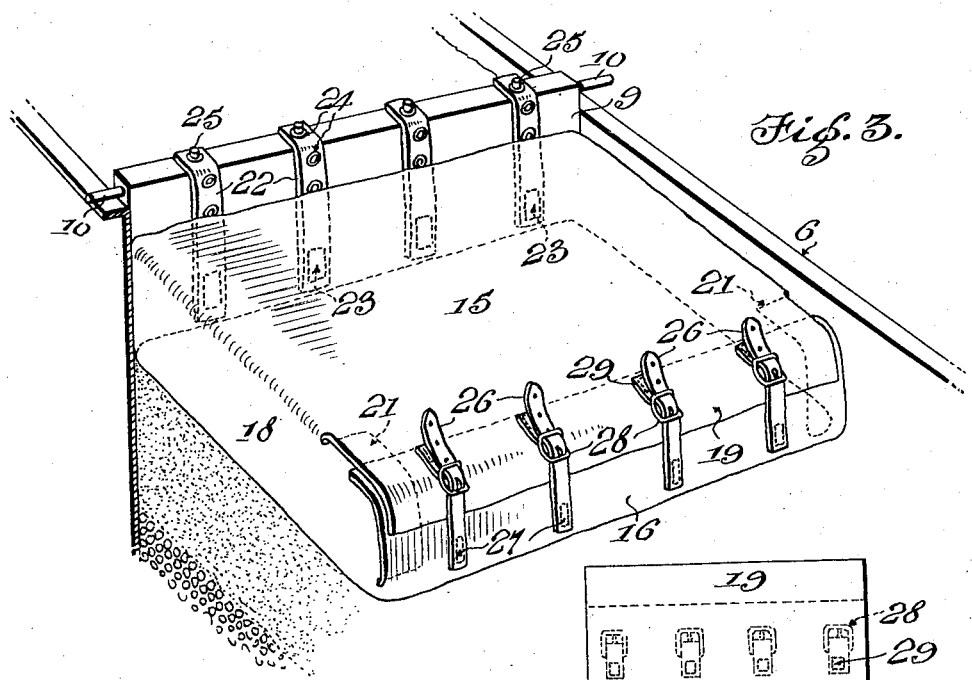
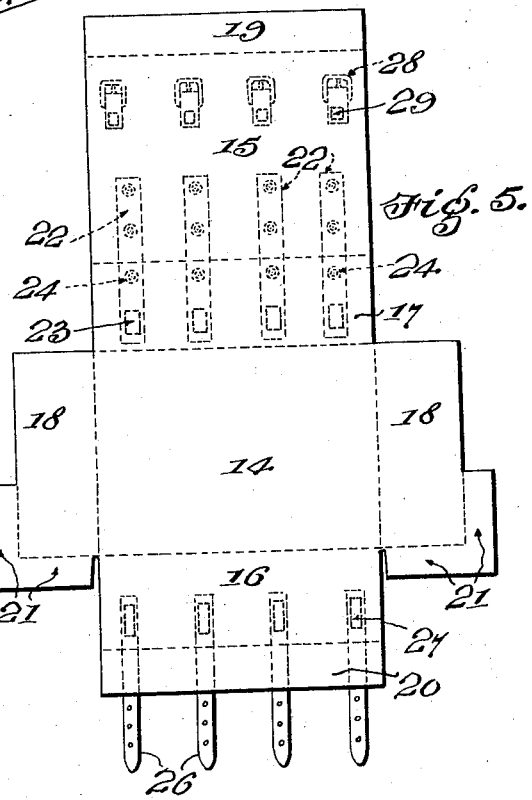
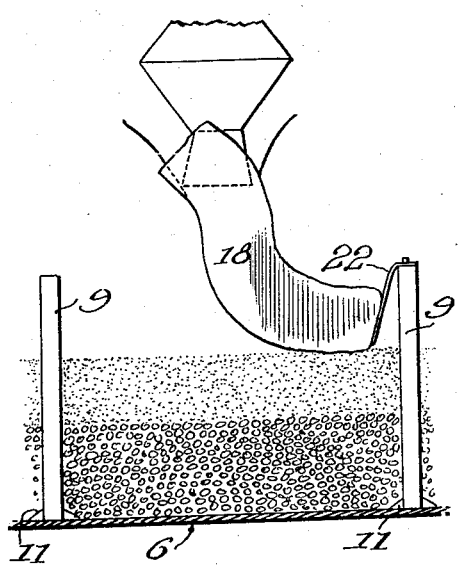
INVENTOR
James M. Titcomb
BY Chas. J. Diller
ATTORNEY

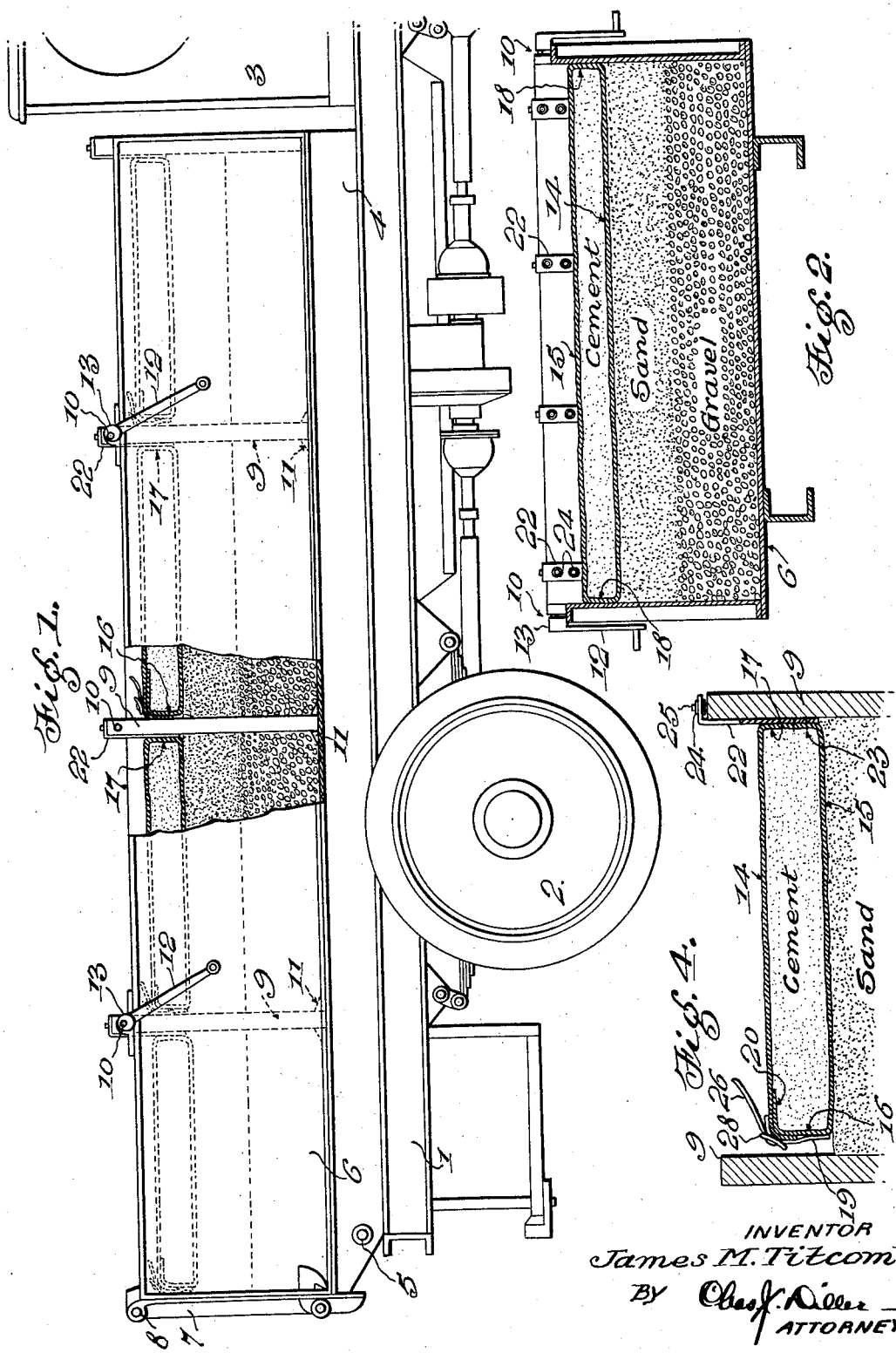

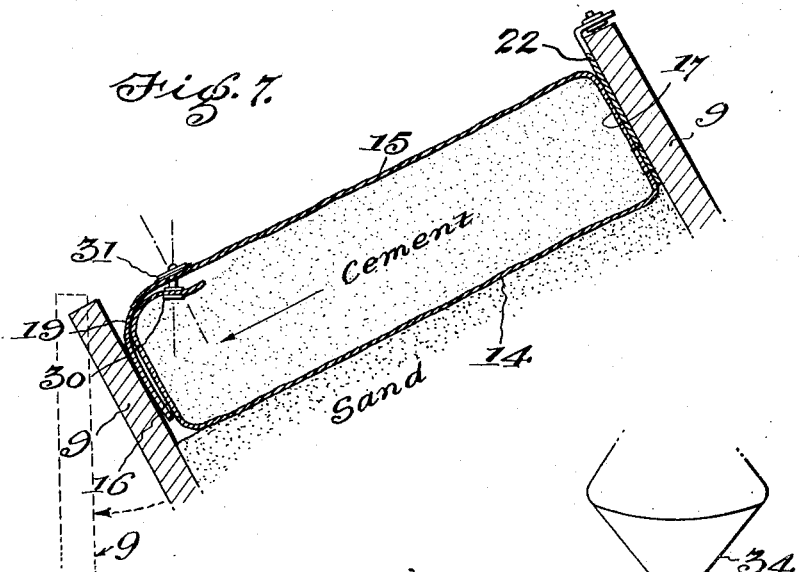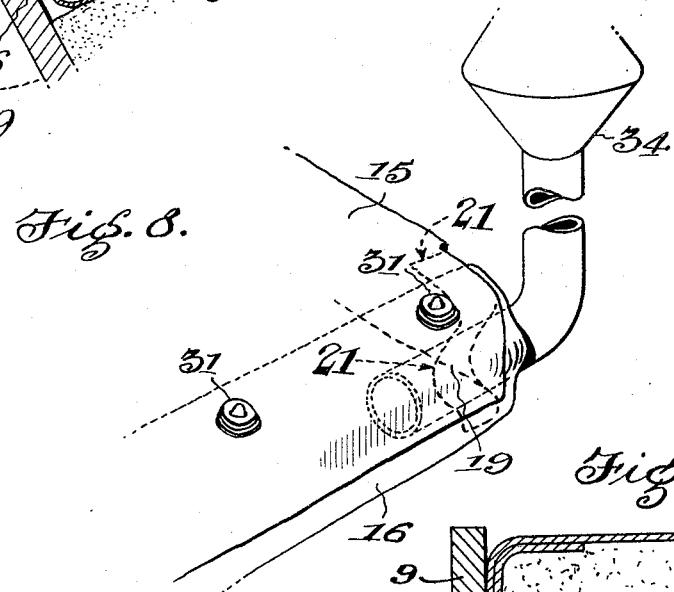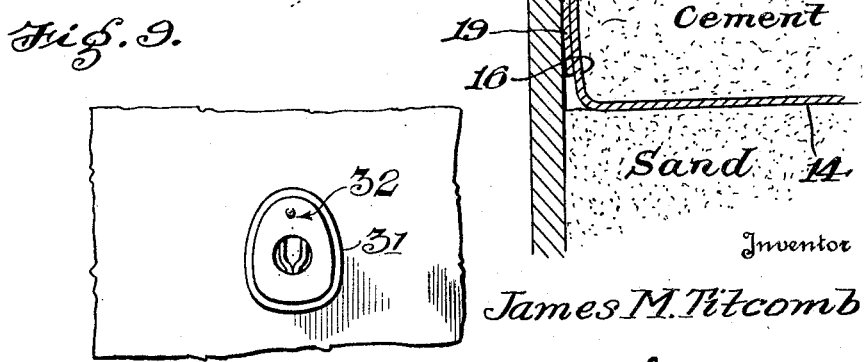

Patented Apr. 18, 1933

1,904,905

UNITED STATES PATENT OFFICE

JAMES MONNESE TITCOMB, OF WASHINGTON, DISTRICT OF COLUMBIA

BATCH DIVIDING AND COVERING MEANS

Application filed September 26, 1930. Serial No. 484,686.

The invention generally has for its object to provide novel means for separating and covering bulk cement or the like when being transported in batch association with sand and gravel or similar materials and primarily seeks to provide certain new and useful improvements over the separating and covering means disclosed in application for Letters Patent Serial Number 361,053, filed by me on May 7, 1929.

In the application for Letters Patent above referred to I disclosed cement covering and separating means in the nature of a plurality of flexible sheets secured along one edge only to the truck body in a manner enabling them to be lapped down into the body in varying degrees to cover the cement and separate it from the sand, and permitting free discharge of the batch without the necessity of manipulating the sheets or any portion thereof. This free edge construction provides for the efficient covering and separation of the cement, and also provides a desirable flexible means capable of being readily collapsed against the truck walls when not in actual use, but the open sides of the superposed sheets make is necessary in loading to first fill the cement into a confining form placed over the separating sheet and then to slowly remove the form to avoid splashing of the cement off into free space due to the fast pouring thereof. The present invention therefore seeks to provide a novel cement receiving envelope which embodies all of the advantages of flexibility, and efficiency of covering and separating the cement which are present in my previously disclosed means but which in addition assures against side splashing during loading, thereby speeding up the loading action and avoiding losses due to the waste incident to such splashing and also those occasioned by reason of the necessity of providing special loading forms or the like.

In its more detailed nature the invention resides in the provision in a cement, sand and gravel batch transporting truck dump body of a novel substantially rectangular and relatively shallow envelope of a size for substantially filling the upper portion of a given batch compartment and having closed top and bottom faces disposed upwardly and downwardly, a closed bottom end directed toward the front of the truck body and secured to a wall thereof, closed side walls, and a removable-mouth-flap-closed top end directed toward the rear of the truck body forming a filler throat for the cement and through which the cement may freely discharge when the truck body is dumped without disturbing the connection of the envelope with the truck body wall.

Another object of the invention is to provide a novel loading and discharging mouth for the envelope and novel means to flexibly connect the envelope to the truck body wall to thereby greatly facilitate loading and discharging of the cement.

Another object of the invention is to provide a novel arrangement of overlapping flaps assuring against free passage of cement out of the envelope.

A further object of the invention is to provide a novel overlapping flap securing means to secure said flaps in position while in transit and releasable to enable outflow of the cement when the truck is dumped.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a somewhat diagrammatic side elevation illustrating the invention applied on a dump truck body, parts being broken away and in section.

Figure 2 is a vertical cross section of the truck body.

Figure 3 is a detail perspective view illustrating one of my improved bulk cement envelopes.

Figure 4 is a longitudinal section of the envelope shown in Figure 3.

Figure 5 is a plan view of ab lank from which the envelope may be formed.

Figure 6 is a somewhat diagrammatic cross section illustrating the manner in which the envelopes facilitate loading.

Figure 7 is a somewhat diagrammatic cross section illustrating the invention equipped with automatically releasable flap securing means.

Figure 8 is a perspective view illustrating one means for filling the envelope while the flaps are secured.

Figure 9 is a fragmentary plan view illustrating one of the securing devices in detail.

Figure 10 is a fragmentary sectional view illustrating the throat defining flaps held in mutual engagement and in engagement with the adjacent truck body wall by pressure of the encased cement.

In the drawings I have shown so much of a truck and its dump body as is necessary to illustrate the application of the invention. The invention is mountable on any conventional form of such truck and since the body elevating or dump effecting mechanism forms no part of the invention it is not shown.

The truck chassis 1 is supported on wheels 2 in the usual manner and the customary cabin is indicated at 3. The body sills 4 are connected pivotally as at 5 upon the chassis beams 1 in the customary manner and support the body 6 which is equipped as usual with the rear dump gate 7 swingably connected to the body at 8.

Batch divider plates or walls 9 are positioned at spaced intervals across the body to divide it into a plurality of batch receiving compartments and the said members 9 are swingably mounted on the body side walls as at 10. In this particular disclosure the members 9 are shown as normally seated in floor seats 11 and when it is desired to dump a batch, the body 6 first having been raised on its pivot 5, it is only necessary to manipulate the respective handle or crank 12 to cause the eccentric hub 13 in which the pivot shaft 10 is secured to engage the top face of the body side and elevate the member 9 out of the seat 11 to enable it to swing on the said shaft 10.

The parts thus far described are all conventional and their detailed construction and manner of operation is well understood to workers in the art. The invention resides in combining with these parts the novel flexible cement covering and separating envelope which I am about to describe.

In order to facilitate an understanding of the details of construction of the envelope, I have illustrated in Figure 5 of the drawings a blank from which the envelope may be formed. It is to be understood, however, that the invention comprehends the construction of the envelopes both from blank form and by fabrication from suitably cut and assembled individual pieces as may be desired. The material is preferably waterproofed canvas but any other suitable flexible material may be employed.

The envelope, constructed from blank form or by fabrication from suitable pieces, includes bottom and top body faces 14 and 15 of like size, front and rear walls 16 and 17 of like size, and side walls 18 also of like size. The top body face is extended to provide an overlap 19, the front wall 16 is similarly extended to provide a cooperating underlap 20, and each side wall 18 carries an L-shaped corner extension 21, the purpose of all of which will become evident as the description progresses. See Figure 5.

The various parts of the envelope referred to in detail hereinbefore are secured together by sewing or otherwise to provide the relatively shallow flexible envelope shown in Figures 2, 3 and 4. The adjacent edges of the walls 16 and 18 however are not secured together and hence there is provided an open mouth for the bag which is closable by the front wall 16 aided by the flaps 20, 19 and 21. It will also be observed that the top body face 15 is joined to the side walls 18 through a portion only of their length, they being secured only to a point approximating the positions of the L-shaped flaps 21, thus providing for an enlarged filler throatway, greater freedom of the flap 19, and also for the provision of said L-shaped flaps.

Mounting straps 22 are secured at 23 to the rear wall 17 and have their free ends provided with grommets 24 to facilitate adjustable connection at 25 with the respective batch divider wall 9.

Flap securing straps 26 may be provided if found desirable. These straps may be secured at 27 to the front wall 16 so that the free ends of the straps may cooperate with the buckles 28 secured at 29 to the top body face 15 for securing the envelope with the cement encased therein.

The mounting straps 22 serve to secure the envelope to the batch dividers in a manner enabling dumping of the cement out through the open throatway without removal of the envelope from its mounting, the connection being flexible enough however to greatly facilitate filling as indicated in Figure 6.

In filling, the open throat of the envelope may be elevated as indicated in Figure 6, the side walls 18 serving to assure against side spilling or splashing of the cement. When the envelope is closed as indicated in Figures 3 and 4 the cement within the enclosure exerts a pressure outward against the flaps 21, 20 and 19, in the order stated, forcing them into tight contact and causing them to effectually seal the envelope opening against egress of cement. The straps 26 serve to assure against displacement of the flaps but it is possible to rely solely upon the engagement of the flaps to seal the opening or to so position the envelope that the divider wall 9 adjacent the envelope opening will serve to hold the front wall 16 against opening movement. See Figure 10.

In Figures 7, 8 and 9 of the drawings I have disclosed a preferred means for securing the flaps while in transit. In this connection I employ the well known "spot" fasteners which are snap fasteners separable by a pull exerted at one point only, indicated by a spot on the female part of the fastener. I so mount these fasteners on my flaps that they will be automatically separated by the pull occasioned by the weight of the cement tending to force the flaps apart during dumping of the truck.

The male fastener members 30 are secured to the flap 20 to project in the manner indicated in Figure 7, and the female fastener members 31 are secured to the flap 19 in position to receive the male members as indicated in Figures 7 and 8.

In Figure 9 of the drawings I have shown one of the female snap members 31 in detail, the "spot" 32 serving to indicate the point at which the member should be lifted to effect its separation from the male member.

As will be readily apparent by reference to Figure 7 of the drawings, as the truck body is dumped the envelope will be lowered at its discharge mouth end causing the weight of the cement to exert a force upon the flap 20 which will cause the fastener members 30 and 31 to move relatively in the manner necessary to permit them to separate automatically and release the cement from the envelope. While the envelope is thus capable of being automatically discharged of its contents upon dumping of the truck without the necessity of first manually manipulating the flap securing devices, the securing devices will prevent any undesirable opening of the flaps such as might be occasioned by wind or similar influences.

My flap equipment also enables the filling of the envelope in the novel manner illustrated in Figure 8 from which it will be observed that a nozzle member 33 may be connected to the discharge hopper 34 and, at envelope loading time, inserted at one end of the envelope between the flaps 21 and 19—20 or intermediately between any adjacent pair of securing devices 26 or 31 and the flaps 19—20 to direct the cement into the closed envelope without disturbing the previously secured flap fastening devices. In this manner the envelopes may be loaded quickly and without danger of the cement spilling out or flying about.

From the foregoing description, taken in connection with the accompanying drawings, it is thought that the novel details of construction, the manner of use and the advantages of my invention will be readily apparent to those skilled in the art to which the invention relates.

What I claim is:

1. In a dump truck body including a bottom and defining walls forming a receiving chamber to receive a batch of sand, gravel, and cement or like varied materials, a flexible cement encasing envelope having engaging flaps defining a discharge throat, and means to secure the envelope to one of the walls, said flaps being engaged in proximity to a movement resisting medium during non-dumping conditions of the batch so as to be pressed into throat sealing frictional engagement with each other and with said movement resisting medium by internal pressure exerted by the encased cement whereby to seal the encasement of the cement during non-dumping intervals but permitting automatic opening of the discharge throat and egress of the encased cement when the pressure exerted by said medium is released by dumping of the batch.

2. In a dump truck body including a bottom and defining walls forming a chamber to receive a batch of sand, gravel, and cement or like varied materials, a flexible cement encasing envelope having a discharge throat formed by overlapping flaps held in frictional contact by pressure of the encased cement, means to secure the envelope to a wall of the truck body at its side opposite the discharge throat, and means to resist the pressure of the encased cement tending to separate the flaps during transit of the truck body but capable of automatically releasing the flaps when the truck body is dumped to release the encased cement.

3. In a dump truck body including bottom and defining walls forming a receiving chamber to receive cement or like material, a flexible cement encasing envelope of a size substantially coincident with the horizontal cross-sectional area of the chamber, said envelope comprising flexible top and bottom body faces, flexible side walls connecting the body faces, a rear portion and overlap and underlap flaps extending from the body faces and defining a discharge throat, said flaps being directed in reverse directions to overlap across the throat, and means to constrain the flaps against separation whereby the pressure of the encased cement will press the flaps into cement sealing relation.

4. In a dump truck body, flexible sheeting disposed to form a cement encasing envelope and including two flaps defining a discharge throat and capable of being overlapped to enable the pressure of the encased cement to hold them in frictional contact, and means to hold the flaps in overlapped relation, said last named means being automatically releasable when during dumping of the truck body the major portion of the weight of the encased cement is imposed upon said flaps.

5. In a dump truck body including a bottom and defining walls forming a receiving chamber to receive cement or like material, a flexible cement encasing envelope, said envelope comprising flexible top and bottom body faces, flexible side walls connecting the body faces, a rear portion and front overlap and underlap flaps held in frictional contact by pressure of the encased cement and providing a discharge throat for the envelope, means to secure the rear portion to a wall of the truck body, and means automatically releasable upon dumping of the truck body to permit free egress of the encased cement but normally active to hold said underlap and overlap flaps in constraint against the pressure exerted by the encased cement.

6. In a dump truck body including a bottom and defining walls forming a receiving chamber to receive cement or like material, a flexible cement encasing envelope, said envelope comprising flexible top and bottom body faces, flexible side walls connecting the body faces, a rear portion and front overlap and underlap flaps held in frictional contact by pressure of the encased cement and providing a discharge throat for the envelope, adjustable straps for securing the rear portion to a wall of the truck body, and means automatically releasable upon dumping of the truck body to permit free egress of the encased cement but normally active to hold said underlap and overlap flaps in constraint against the pressure exerted by the encased cement.

7. In a dump truck body including a bottom and defining walls forming a receiving chamber to receive cement or like material, a flexible cement encasing envelope of a size substantially coincident with the horizontal cross-sectional area of the chamber, said envelope comprising flexible top and bottom body faces, flexible side walls connecting the body faces, a rear portion and overlap and underlap flaps extending from the body faces and defining a discharge throat, said flaps being directed in reverse directions to overlap across the throat, said overlap flap being directed downwardly and outside the underlap flap to provide a watershed, and means to constrain the flaps against separation whereby the pressure of the encased cement will press the flaps into cement sealing relation.

8. In a dump truck body including a bottom and defining walls forming a receiving chamber to receive a batch of sand, gravel and cement or like varied materials, flexible sheeting disposed to encase the cement of the batch and including engaging flaps directed toward the dumping end of the truck and forming discharge throat closure flaps, means to secure the sheeting to a wall of the truck body remote from the dumping end of the truck body, and means to secure the flaps against displacement during transit but automatically releasable upon dumping of said truck body to provide for free discharging of the encased cement.

9. In a dump truck body including a bottom and defining walls forming a receiving chamber to receive a batch of sand, gravel and cement or like varied materials, flexible sheeting disposed to encase the cement of the batch and including engaging flaps directed toward the dumping end of the truck body and forming discharge throat closure flaps, and means to secure the sheeting to a wall of the truck body remote from the dumping end of the truck body, said flaps being overlapped adjacent one defining wall whereby they will be pressed by the encased cement into frictional contact with each other and against said adjacent wall to securely encase the cement during transit of the truck body and yet free to automatically release the encased cement when the body is dumped.

10. In a dump truck body including a bottom and defining walls forming a receiving chamber to receive cement or like material, a flexible cement encasing envelope of a size substantially coincident with the horizontal cross-sectional area of the chamber, said envelope comprising flexible top and bottom body faces, flexible side walls connecting the body faces, a rear portion and overlap and underlap flaps extending from the body faces and defining a discharge throat, said flaps being directed in reverse directions to overlap across the throat, said flaps lying adjacent one body wall so that said wall will serve to constrain the flaps against separation whereby the pressure of the encased cement will press the flaps into cement sealing relation.

11. In a dump truck body including a bottom and defining walls forming a receiving chamber to receive cement or like material, a flexible cement encasing envelope of a size substantially coincident with the horizontal cross-sectional area of the chamber, said envelope comprising flexible top and bottom body faces, flexible side walls connecting the body faces, a rear portion and overlap and underlap flaps extending from the body faces and defining a discharge throat, said flaps being directed in reverse directions to overlap across the throat, said overlap flap being directed downwardly and outside the underlap flap to provide a watershed, said overlap flap lying adjacent one body wall so that said wall will serve to constrain the flaps against separation whereby the pressure of the encased cement will press the flaps into cement sealing relation.

12. In a dump truck body including a bottom and defining walls forming a receiving chamber to receive a batch of sand, gravel and cement or like varied materials, a flexible shallow and substantially rectangular cement encasing envelope, said envelope comprising flexible large area top and bottom body faces, flexible shallow area bottom end and side walls secured to the body faces, a front wall, and overlap and underlap flaps extending from said top body face and said front wall providing a flap closed discharge throat for the envelope, means to secure the bottom end wall to a wall of the truck body, and means to secure said underlap and overlap flaps to position while the truck is in transit, said last named means being automatically releasable upon dumping of the truck body to release the flaps and permit free dumping of the cement.

13. In a dump truck body including a bottom and defining walls forming a receiving chamber to receive cement or like material, a flexible cement encasing envelope, said envelope comprising flexible top and bottom body faces, flexible side walls connecting the body faces, a rear portion and front overlap and underlap flaps held in frictional contact by pressure of the encased cement and providing a discharge throat for the envelope, means to secure the rear portion to a wall of the truck body, said side walls being connected to the top body face throughout a portion only of their length to provide greater freedom of said overlap flap, and means automatically releasable upon dumping of the truck body to permit free egress of the encased cement but normally active to hold said underlap and overlap flaps in constraint against the pressure exerted by the encased cement.

14. In a dump truck body including a bottom and defining walls forming a receiving chamber to receive a batch of sand; gravel and cement or like varied materials; a flexible cement encasing envelope; said envelope comprising flexible large area top and bottom body faces; flexible side walls secured to the body faces, a rear portion, and front overlap and underlap flaps extending from said top body face and said front wall providing a discharge throat; and means to secure the rear portion to a wall of the truck body; said side walls being secured to the top body face throughout a portion only of their length to provide greater freedom of said overlap flap; and having side wall flap extensions for cooperating with the first mentioned flaps in sealing the envelope against free egress of cement.

15. In a dump truck body including a bottom and defining walls forming a receiving chamber to receive a batch of sand; gravel and cement or like varied material; a flexible cement encasing envelope; said envelope comprising flexible large area top and bottom body faces, flexible side walls secured to the body faces, a rear portion and front overlap and underlap flaps extending from said top body face and said front wall providing a discharge throat; and means to secure the rear portion to a wall of the truck body; said side walls being secured to the top body face throughout a portion only of their length to provide greater freedom of said overlap flap; and having side wall flap extensions for cooperating with the first mentioned flaps in sealing the envelope against free egress of cement; and releasable means to secure said underlap and overlap flaps to position.

JAMES MONNESE TITCOMB.